United States Patent

Cruz, Jr.

Patent Number: 5,441,118
Date of Patent: Aug. 15, 1995

[54] WEED TWISTER

[76] Inventor: Ramon M. Cruz, Jr., P.O. Box 9326, N. Hollywood, Calif. 91609

[21] Appl. No.: 177,139

[22] Filed: Jan. 4, 1994

[51] Int. Cl.⁶ .................................... A01B 1/18
[52] U.S. Cl. .................... 172/378; 172/381; 175/20; 47/47
[58] Field of Search .............. 172/378, 376, 381, 371, 172/25; 366/343, 318, 247, 100, 64; 175/19, 20; 52/165, 162; 47/47; 248/156; 294/50.6

[56] References Cited

U.S. PATENT DOCUMENTS

| | | | |
|---|---|---|---|
| 629,475 | 7/1899 | Sharpe | 172/376 |
| 794,119 | 7/1905 | Richardson | 172/376 |
| 968,968 | 8/1910 | Oblosser | 294/55.5 |
| 1,049,600 | 1/1913 | Rambeaud | 366/100 X |
| 1,226,539 | 5/1917 | Larson et al. | |
| 1,506,142 | 8/1924 | Stubbs | 366/64 |
| 1,772,512 | 8/1930 | Hathorn | |
| 1,857,500 | 5/1932 | Davison | |
| 1,931,773 | 10/1933 | Sobol | |
| 2,164,373 | 7/1939 | Ayliffe | |
| 2,293,305 | 8/1942 | Oldham | 248/156 X |
| 2,437,393 | 3/1948 | Kramer | 294/50.6 |
| 2,577,333 | 12/1951 | Klum et al. | 248/156 X |
| 2,652,236 | 9/1953 | Lum | 366/343 X |
| 2,680,643 | 6/1954 | Cravotta | 172/378 X |
| 2,905,453 | 9/1959 | Wise | 366/343 X |
| 3,061,270 | 10/1962 | Lowe | 254/132 |
| 3,129,771 | 4/1964 | Lidstone | 172/378 X |
| 3,273,929 | 9/1966 | Shurtz | 294/50 |
| 3,771,794 | 11/1973 | Crockett | 172/378 X |
| 4,326,743 | 4/1982 | Tamura | 294/55.5 |
| 4,736,928 | 4/1988 | Smikstein | 254/132 |
| 4,819,736 | 4/1989 | Hedgepeth | 172/25 |
| 4,905,768 | 3/1990 | Lorenz | 172/378 X |
| 5,060,997 | 10/1991 | Plecki | 172/25 X |
| 5,073,033 | 12/1991 | Klepeis | 366/343 |
| 5,110,123 | 5/1992 | Larson | 172/378 X |
| 5,133,269 | 7/1992 | Charneski | 172/25 X |
| 5,207,466 | 5/1993 | Ohlson | 172/378 X |
| 5,261,496 | 11/1993 | Smotherman | 172/378 X |

FOREIGN PATENT DOCUMENTS

| | | | |
|---|---|---|---|
| 62-27814 | 6/1987 | Japan | 366/343 |
| 647402 | 2/1979 | U.S.S.R. | 52/162 |

Primary Examiner—Randolph A. Reese
Assistant Examiner—Christopher J. Novosad

[57] ABSTRACT

A tool for removing roots, plants and other tubular objects from the earth while only minimally disturbing the surrounding soil. The tool includes a first, proximal end serving as a handle for rotating the tool and a second end including a plurality of coil-shaped tines. The tines include relatively sharp points and are shaped to efficiently penetrate the soil when the tool is rotated, disrupting the root system. Once engaged in the vertex of the tines, the main root stem entangles in the coil and rotates with the tool, eventually becoming free of the surrounding soil. The coil also maintains a grasp of the plant once removed from the earth which eliminates the extra step of picking up the removed plants from the surface of the soil.

6 Claims, 1 Drawing Sheet

WEED TWISTER

BACKGROUND-FIELD OF THE INVENTION

This invention generally relates to a garden tool, and more particularly to an improved tool for removing individual weeds and unwanted plants from the earth by directly engaging their roots without separating the roots from the stem and with minimal disturbance of surrounding earth and other plants.

BACKGROUND-DESCRIPTION OF PRIOR ART

Although weeds are usually pulled by hand, a number of tools have been used to assist in either loosening the soil surrounding the roots or to cut weeds above or below the soil surface. A common weeder with a "V" shaped prong is used to engage the roots of a single weed but is not very effective since it often requires several stabbing motions to strike the targeted roots and very often leaves major portions of the root system intact while cutting the upper portions. This means that weeds are still likely to grow back from the roots.

Shovel-shaped tools are not satisfactory for removing individual weeds when the weeds are growing in close proximity to other plants that should not be disturbed. Smaller, hand-held shovels, may not threaten other plants, but still require several stabbing motions to loosen the soil surrounding the roots and often cut the roots at the upper extensions, leaving parts of the roots in the soil.

A number of fork-shaped tools have been used for removing weeds, but these tools are unsatisfactory since they cannot target the roots of a single plant when the plants are growing in close proximity. A fork with only two tines may disrupt a smaller section of earth than forks with more tines, but these forks merely loosen the soil surrounding the roots and do not effectively engage the roots for efficient removal.

The three-tined tool (one tine with two adjacent blades) in U.S. Pat. No. 4,819,736 to Hedgepeth requires a power screw driver or a power drill or a socket wrench to twist the tine into the soil to engage the roots. The main limitation of this device is its inefficiency in the amount of work required to engage and remove the roots, regardless of whether the work is done manually or by powered rotating devices. Also, the three-tined device disturbs a greater area of soil than a tool with a lesser number of tines or blades. Another limitation of the three-tined tool and other designs is that it does not effectively pick up or hold the weed after its removal from the soil, requiring the user to stoop down and pick up each weed after using the device.

Herbicides have also been used to kill weeds with the inherent risks of harming the growth of nearby desired plants and of polluting water resources. What is needed, therefore, is a tool that can effectively engage the roots of a single weed with a minimum of work and effort and can remove the roots without severing the roots from other parts of the plant and without disturbing much of the earth surrounding the plant. Also needed, is a device that grasps the weeds after removal in order to eliminate the extra task of stooping down to pick up the removed weeds from the ground.

SUMMARY OF THE INVENTION

As the name 'Weed Twister' implies, this invention has a coiled two-tined fork which engages the roots beneath the surface by manually twisting the coil at the base of the weed. The tool efficiently facilitates the removal of the roots and weed intact with a simple twisting and pulling motion. No stabbing or rapid motion is required. No external power or other rotating tools are required, although a powered embodiment would also be effective. The handle is oriented perpendicular to the shank and is large enough to support the torque necessary to twist the coiled fork into the earth. The center line of the coil is common to the shank center line. Two tines having a common vertex extend outwardly from the shank's center line and coil away from the handle at a constant radius. At the end of each coiled tine a relatively sharp point allows for easy penetration into the earth. Each tine is rod shaped allowing for more efficient penetration and twisting into the soil than other blade-shaped or flat-shaped designs with wide surfaces perpendicular to the rotating direction. The soil is loosened at the level of the coil tips while the root is twisted at the level of the vertex, which allows for the root to be pulled out in its entirety. The twisting motion pulls the root's extended fibers out of the loosened soil more gently than a straight vertical pulling motion.

The dimensions of the coil radius may vary in different embodiments as may the length and shape of the handle and shank. An extended shank will allow for the removal of weeds without the user stooping down or kneeling down, and a wider radius with stronger materials will support the efficient removal of larger weeds. Another advantage of the coil-shaped fork is that the weed remains in the coil after removal from the soil which eliminates the need to stoop down and pick up the weeds after removal.

OBJECTS AND ADVANTAGES

Accordingly, several objects and advantages of the present invention are:
(a) to provide a tool for removing individual weeds that effectively removes the entire root system;
(b) to provide a tool that removes an individual root without disrupting much of the surrounding earth;
(c) to provide a tool that grasps the root and weed after removal to eliminate the extra step of picking up removed roots from the ground;
(d) to provide a tool that efficiently uses a manual torque and lifting force instead of other less efficient methods;
(e) to provide a tool that can be used without stooping or kneeling down;
(f) to provide a tool that is easy to use without training, skill or much physical effort; and
(g) to provide a tool with no moving parts and with a simple manufacturing design in order to lower the cost.

Still further objects and advantages will become apparent from a consideration of the ensuing description and drawings.

DRAWING FIGURES DESCRIPTION

Figures 1, 2:
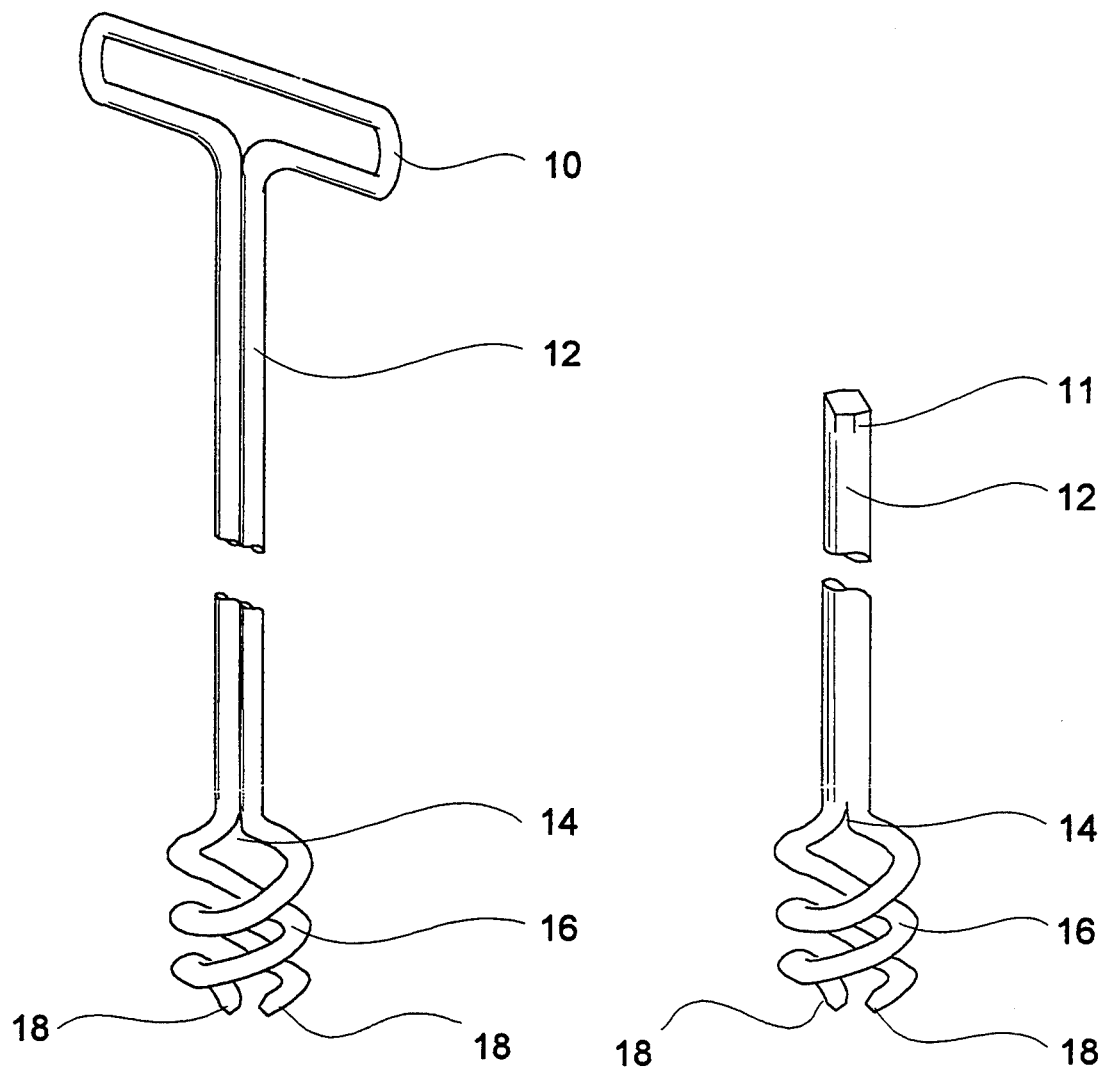
FIG. 1 is a perspective view of a typical embodiment of a plant removing tool designed in accordance with the present invention featuring a manual handle.
FIG. 2 is a perspective view featuring a fitting for applying an external rotating means.

REFERENCE NUMERALS IN DRAWINGS 10 handle 11 fitting for external rotating means
12 shank
14 fork vertex
16 coiled fork tines
18 sharp points

DETAILED DESCRIPTION OF THE PRESENTLY PREFERRED EXEMPLARY EMBODIMENT

A typical embodiment of the present invention is illustrated in the drawing FIG. 1. The tool has a wide handle 10 which is extended perpendicularly to the shank 12 which connects at the approximate midpoint of the handle. The length of the handle is approximately 10 cm or roughly the size of the palm of the human hand. The handle can have any shape which fits comfortably in the hand and which allows for torque or twisting. The length of the shank is roughly 20 cm in the preferred embodiment, but may be extended to greater lengths in order to minimize the amount of stooping or kneeling required to use this invention. If the length of the shank exceeds about 80 cm, a lever or additional handle about 80 cm from the fork vertex 14 may be advantageous to allow for additional torque at a convenient position for the extended arm when the user is standing erect.

At the distal end of the shank, a fork with two tines 16 extends in coils with a common center line which center line is also common to the center line of the shank. The diameter of the coils is roughly 3 cm or larger depending on the strength of the material and on the overall embodiment design. To attack larger plants or penetrate harder earth, larger dimensions and diameters may be advantageous. The angle of decline of the coil is about 30° to 45° from the perpendicular to the center line. The distance from the fork vertex to the relatively sharp points 18 is roughly 6 cm or a length sufficient to allow at least one complete coil for each tine. The number of complete coils for each tine is one or more, based on the spacing and the angle of decline. The spacing between the coils for each tine should be about 1 cm or equal to the approximate thickness of the tines. The initial angle of decline for each tine near the vertex should be adjusted relatively in order to provide for even spacing between the tines as the coils spiral outward to their full circumference.

In the preferred embodiment a single rod of high tensile strength metal is used to form the entire tool: from the sharp point of one tine, coiling to the vertex and extending linearly as the shank to the handle where it loops around and joins the other length of the shank and runs in parallel to the vertex where it becomes the second tine and coils around to the second sharp point. This embodiment is intended to illustrate a simple design that supports the force needed at critical stress points caused by the torque action, such as the fork vertex and the base of the handle. A few welds at the vertex and at several points along the shank are all that is needed to complete the manufacture of this embodiment once the rod is properly shaped. In this embodiment, the diameter of the rod cross-section is roughly 6 mm to 10 mm. The spacing between coiled tines is roughly equal to the diameter of the rod cross-section.

Another embodiment with a longer shank of approximately 80 cm or longer would allow the user to effectively remove weeds without stooping or kneeling down. In this embodiment, the length of the shank is roughly equal to the distance between the human hand and the ground while standing erect. Other useful embodiments include longer shanks, adjustable shanks, and variations in the location, shape and number of handles. Still another embodiment includes a means of using external power or leveraged mechanisms to aid in twisting or rotating the coiled fork into the earth, as illustrated in FIG. 2. One means of using external power for rotating the device would be to design the proximate end of the shank with a fitting 11 having a plurality of flat faces defined about the circumference of the proximal end that locks securely into the rotating opening of a power drill or power screw driver which functions as a clamping attachment device. In this embodiment, the handle would not be needed since its purpose is generally to provide a means of rotating and holding the shank and coiled fork.

OPERATION

The manner of using the present invention in the preferred embodiment is to grasp the handle 10 by the human hand and to push the sharp points 18 into the earth next to the base of the weed while pointing the direction of the shank 12 in a line that will roughly intersect the main root stem at its approximate midpoint. By twisting in the clockwise direction and pushing down towards the root, the coiled fork tines 16 will loosen the earth surrounding the main root stem without severing the root. By continuing to twist, eventually the root stem will engage with the fork vertex 14, causing the root stem itself to twist in the same direction. The smaller root extensions will become free from the soil that was loosened by the coiled tines as the main root stem is rotated. Deeper and larger roots may require more rotations than smaller roots. The entire visible plant will begin to rotate freely when the root stem has been completely released from the earth, which will be obvious to the user, and will signal the time to simply lift the tool with the plant engaged in the coiled fork out of the earth. Several plants may be collected and held in the coiled forks without compromising the ability of the tool to continue to remove more weeds. Thus, the user may remove as many as 5 to 10 plants without having to clear them from the grasp of the coiled forks. Once the coils are full of plant material, the user can remove the plants by either grasping them by one hand or by stepping on them and twisting the handle in the counterclockwise direction.

Due to the design of the coiled tines, the amount of effort required to twist the shank is minimal. This efficiency is aided by the sharp points, the coil shape, and the lack of flat or large surfaces perpendicular to the direction of rotation. The longer the distance between the fork vertex 14 and the sharp points 18, the greater the amount of soil loosening prior to the initial twisting of the root stem. Therefore, if deeper roots are targeted, either more care at aiming at the lower portion of the root is needed, or the use of an embodiment of this invention with longer coils and possibly with a greater diameter is advantageous. If the soil is very hard or dry and compacted, it may be necessary to moisten the soil prior to using this invention.

In using embodiments of this invention where the handle has been replaced by an externally powered rotating device (FIG. 2), the user would grasp the rotating device instead of the handle and would otherwise operate the device in the same manner as the manual embodiment. While it is contemplated that the tool is preferably formed from metal, it is to be understood that other sufficiently rigid materials, such as plastic or wood could be used to form any part of this invention.

SUMMARY, RAMIFICATIONS, AND SCOPE

Accordingly, the reader will see that the present invention provides an effective means of removing an individual weed with its roots intact in an efficient manner without disturbing much of the surrounding earth. This highly reliable, lightweight, yet economical device can be used by persons of almost any age and physical disposition. A great number of elderly people and physically challenged people today enjoy gardening in their leisure. The 'Weed Twister', especially with the lengthened shank embodiment, would provide such individuals with the facility for removing weeds without much effort and without stooping or straining their backs. The efficient twisting motion and the ability to grasp the root after removal are features not found in other tools.

While my above description contains many specificities, these should not be construed as limitations on the scope of the invention, but rather as an exemplification of one preferred embodiment thereof. Many other variations are possible. For example, the number of tines forming the forked coil may be greater or less than two. If less, another appendage may be necessary to effectively engage the root stem. The coil may have a shape that is not perfectly circular, but may be elliptical or irregularly shaped, although such variations may compromise the efficiency of the tool. The shape of the fork vertex may or may not be symmetrical to the shank center line and may have angles that vary over a wide range. The circumference of the coil may vary at different levels. For example, the circumference may increase towards the sharp points to form a conical shape, or increase and decrease at various levels, or have a variety of non-geometric dimensions. The sharp points may have a variety of shapes which do not necessarily have to be regular or geometric.

Not only plant material may be the target of this tool, but also other man-made tubular objects such as cables, hoses, electric conduits, and the like. For example, an industrial embodiment may include external rotating power and have the dimensions appropriate for unearthing undesired cabling several meters beneath the surface of the earth. The shape of the shank may also have various angles to support the twisting motion or to add more comfort to the user or to support a better grip. Thus, the preferred embodiment is presented here as a basic, simple, economic, and efficient alternative from a wide variety of anticipated embodiments.

Accordingly, the scope of the invention should be determined not by the embodiments presented, but by the appended claims and their legal equivalents.

I claim:

1. A tool for removing plants and other tubular objects comprising:
   an elongated main body member having a first, proximal end and a second, distal end;
   said proximal end including a means for holding said main body member by the hand and supporting a rotation of said main body member about a longitudinal axis thereof including an elongated member extended perpendicularly to the longitudinal axis of said main body member at approximately equal lengths from said main body member; and
   said distal end being generally coil shaped including means for engaging and disrupting a root system and soil surrounding the base of an unwanted plant including a plurality of tines coiled along a longitudinal axis parallel to the longitudinal axis of said main body member, said tines being generally rod shaped and having approximately equal length and shape and being relatively evenly spaced with a gap between them of a dimension approximately equal to the diameter of the cross-section of each of said tines, said tines including a means for penetrating and loosening the soil surrounding a root system including relatively sharp points at their distal ends, said tines declining from a perpendicular to the longitudinal axis of said main body member at an approximate angle of 30°–45°, said tines each completing approximately one or more complete loops in the coil prior to a point of teronination, said coil having an approximate diameter of 3 cm.

2. A tool as in claim 1, wherein said proximate end, said main body member and said distal end are comprised of a single, elongated metal rod.

3. A tool as in claim 2, wherein the distal end includes 2 tines, each having an approximately equal cross-section diameter and an approximately equal length, and oriented in a complementary fashion to create a uniform coil-shaped design.

4. A tool for removing plants and other tubular objects comprising:
   an elongated main body member having a first, proximal end and a second, distal end;
   said proximal end including a means for coupling said main body member to a means for rotating said main body member about a longitudinal axis thereof;
   said distal end being generally coil shaped including means for engaging and disrupting a root system and soil surrounding the base of an unwanted plant including a plurality of tines coiled along a longitudinal axis parallel to the longitudinal axis of said main body member, said tines being generally rod shaped and having approximately equal length and shape and being relatively evenly spaced with a gap between them of a dimension approximately equal to the diameter of the cross-section of each of said tines, said tines including a means for penetrating and loosening the soil surrounding a root system including relatively sharp points at their distal ends, said tines declining from a perpendicular to the longitudinal axis of said main body member at an approximate angle of 30°–45°, said tines each completing approximately one or more complete loops in the coil prior to a point of termination, said coil having an approximate diameter of 3 cm.

5. A tool as in claim 4, wherein said means for coupling comprises a plurality of flat faces defined about a circumference of said proximal end for engagement with a clamping attachment device provided on a means for rotation.

6. A tool as in claim 5, wherein the distal end includes 2 tines, each having an approximately equal cross-section diameter and an approximately equal length and shape, and oriented in a complementary fashion to create a uniform coil-shaped design.

* * * * *